U. PAVESI.
VEHICLE WITH TWO OR MORE PAIRS OF DRIVING WHEELS.
APPLICATION FILED DEC. 27, 1918.
1,353,848. Patented Sept. 28, 1920.
4 SHEETS—SHEET 1.
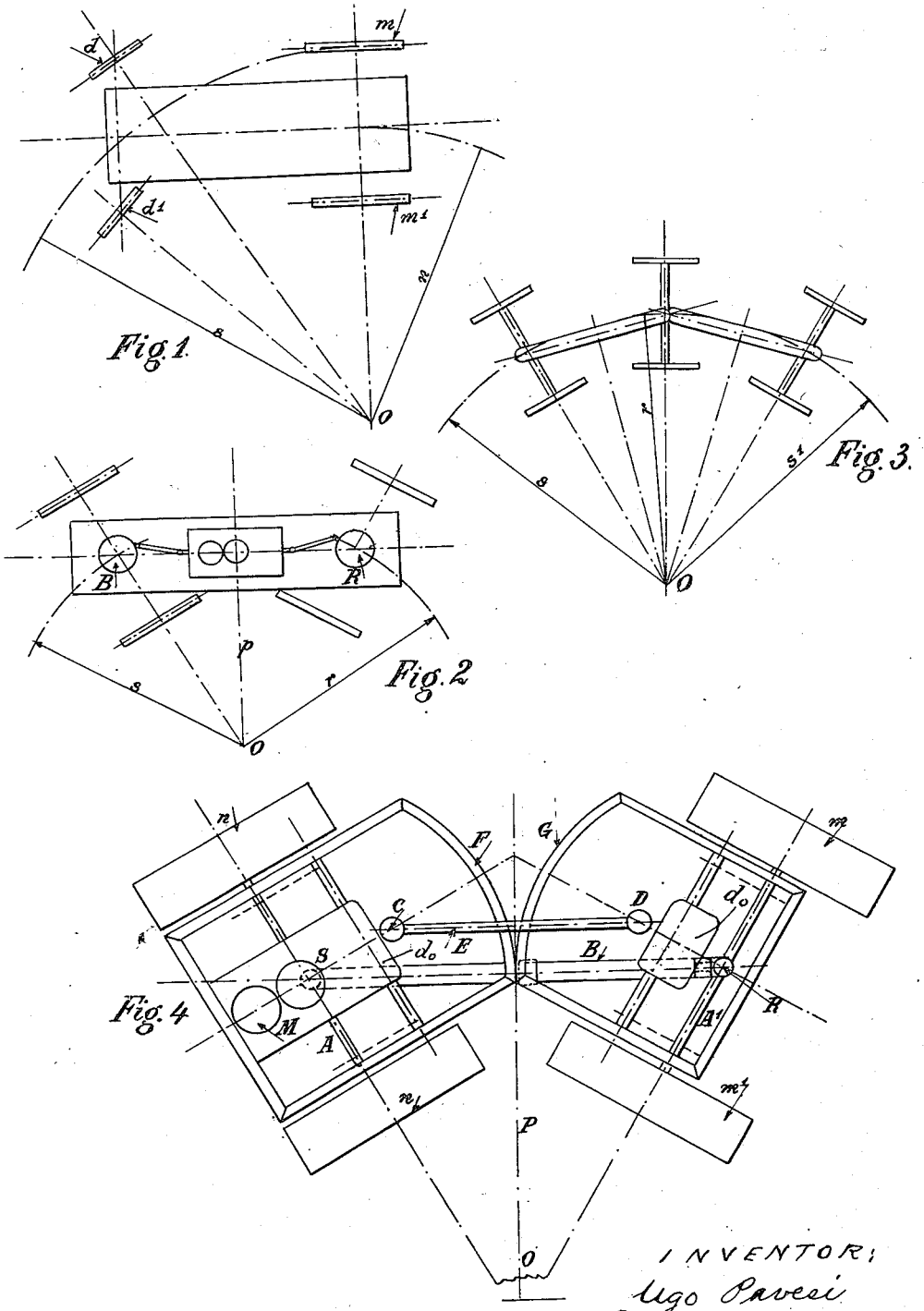

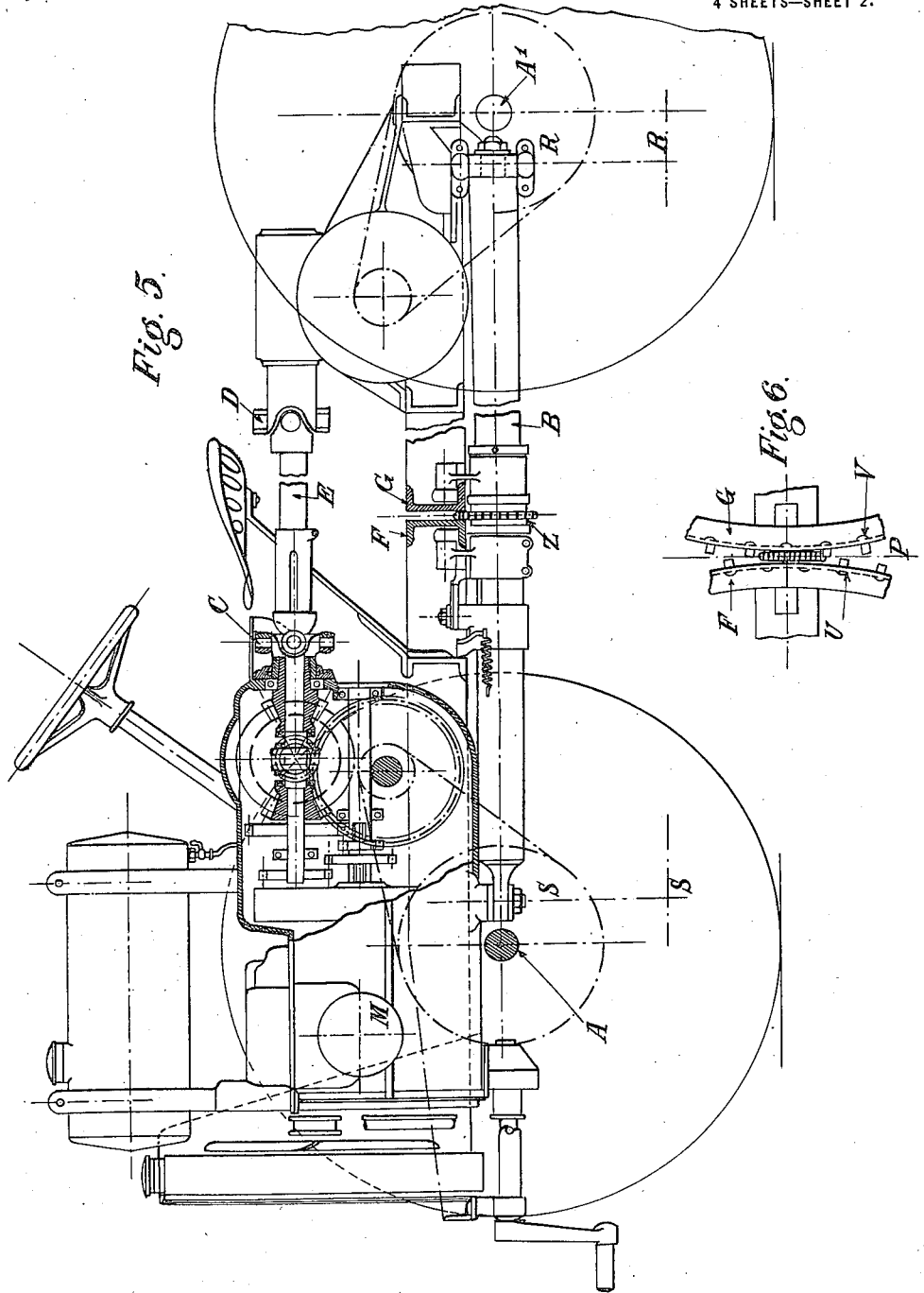

U. PAVESI.
VEHICLE WITH TWO OR MORE PAIRS OF DRIVING WHEELS.
APPLICATION FILED DEC. 27, 1918.
1,353,848.
Patented Sept. 28, 1920.
4 SHEETS—SHEET 3.
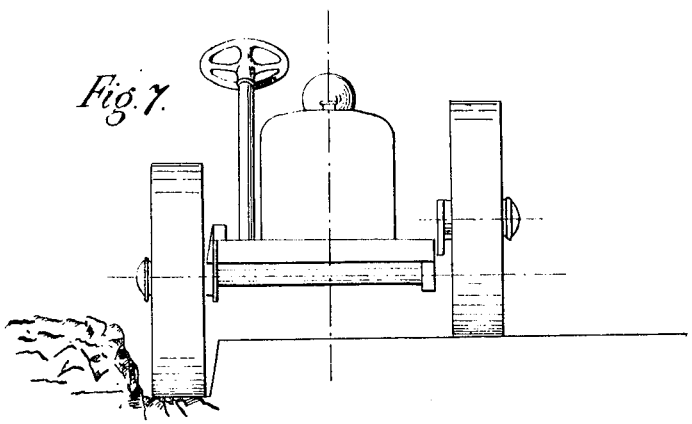
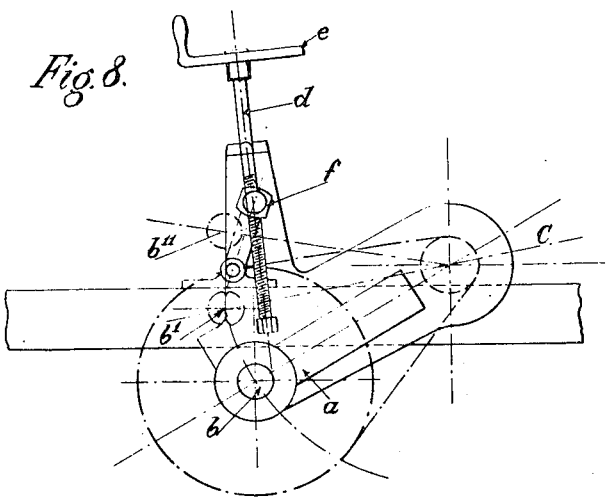

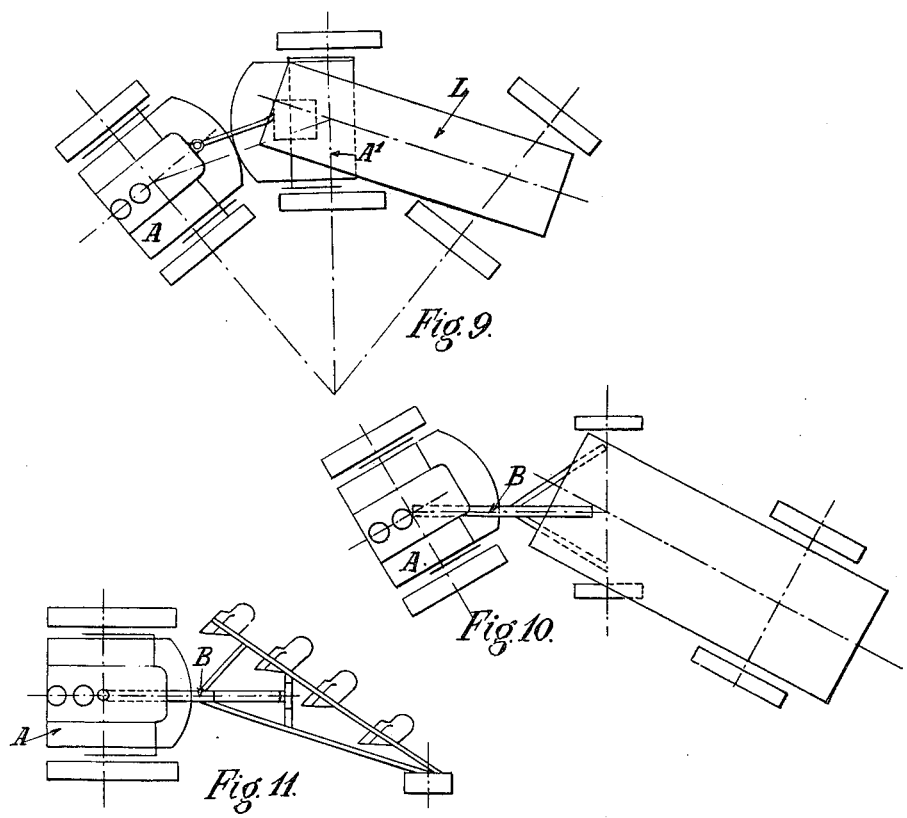

UNITED STATES PATENT OFFICE.

UGO PAVESI, OF MILAN, ITALY.

VEHICLE WITH TWO OR MORE PAIRS OF DRIVING-WHEELS.

1,353,848.   Specification of Letters Patent.   Patented Sept. 28, 1920.

Application filed December 27, 1918. Serial No. 268,502.

*To all whom it may concern:*

Be it known that I, UGO PAVESI, subject of the King of Italy, resident of Milan, in the Kingdom of Italy, N. 18 Via Oglio, have invented certain new and useful Improvements in the Vehicles with Two or More Pairs of Driving-Wheels; and I do hereby declare that the following is a full, clear, and exact description of the same.

The present invention, by means of a novel arrangement of mechanical parts, provides a practical and simple solution of the construction and working of an automobile vehicle fitted with two or more pairs of driving wheels and adapted to haul agricultural machines and the like, while the same solution implies the "correct steering" of the vehicle as a necessary consequence.

With reference to the annexed drawings:

Figure 1 diagrammatically shows an ordinary vehicle while steering.

Fig. 2 diagrammatically shows one method of solving the problem in the case of a two-axle vehicle.

Fig. 3 diagrammatically shows one method of solving the problem in the case of a three-axle vehicle.

Fig. 4 shows a practical embodiment of the invention as applied to a two-axle vehicle.

Fig. 5 shows in side elevation a vehicle fitted with the arrangement according to the invention.

Fig. 6 shows the center portion of Fig. 5 in plan.

Fig. 7 is a front view of a vehicle having both the left hand wheels vertically displaced with respect to the right hand wheels.

Fig. 8 is a side view of the arrangement which permits of the vertical displacement shown in Fig. 7.

Fig. 9 diagrammatically shows the combination of a vehicle according to Fig. 4 with a trailing vehicle likewise provided with "correct steering" arrangement.

Figs. 10, 11 and 12 diagrammatically show as further applications three examples in which the arrangement serves as steerable fore-train adapted to tow other vehicles which may also have no steering gear.

An ordinary automobile vehicle having two driving wheels —$m$—$m'$— (Fig. 1) and two steering-wheels —$d$—$d'$— when turning describes with its two front wheels two curves that do not coincide with the curves described by the two rear wheels and at each instant, if O be the center of rotation of the vehicle, the velocity of the differential gear (which is equal to the average velocity of the wheels —$m$—$m'$— and proportional to the radius —$r$—) is considerably different from that of the two front wheels (proportional to the radius —$s$—).

Accordingly, if it is desired that also the two steering-wheels —$d$—$d'$— shall be made into driving wheels, it is necessary to impart to the front differential gear a velocity which is continually different from that imparted to the rear differential gear. Hence the necessity of providing a third differential gear arranged between the two axle differential gears and driven in its turn by the driving engine.

This indeed is the solution adopted in several automobile vehicles having four driving wheels, which solution involves further serious constructional complications in the transmission of motion to the two steering and driving wheels.

In order therefore to simplify the embodiment of a vehicle fitted with two pairs of driving wheels, it will be first necessary to cause the mean or average speed of the rear wheels to be equal at any moment to the mean or average speed of the two front wheels (that is to say to cause radius —$r$— always to be equal to radius —$s$—), thus eliminating the necessity of a third differential gear.

To accomplish this, it is necessary that the structure be so organized that straight lines passing longitudinally through the axes of the four wheels shall intersect each other whenever the axles are rotated through a horizontal path, as illustrated at the point O (Fig. 2) of the straight line —$p$—, which is the vertical line which medially intersects the straight line connecting the axle centers R—S. By so doing, the further advantage is secured that the vehicle will become a "correct turning" vehicle, since the wheels (right and left hand) of one axle will obviously follow the trajectories respectively marked by the right and left hand wheels of the other axle.

Similarly in the case of a vehicle with three pairs of driving wheels (Fig. 3) the organization must be such that the mean or average radii —$r$—$s$—$s'$— are at all times equal in order to insure that the average speeds of the axles be equal, and that the motion can be transmitted directly from one and the same driving member to the three differential gears of the axles. The same applies to vehicles with four or more pairs of driving wheels.

The practical embodiment of the invention can be realized (Fig. 2) by arranging the driving apparatus on the framework connecting the axles with one another and by transmitting the motion through suitable flexible arrangements (chains, ropes, etc.), to the individual differential gears and thence to the wheels which, being connected by means of any preferred motion transmitting device, are obliged to steer simultaneously and in the manner desired, that is to say, through the same angle relatively to the straight line connecting the axle centers with one another.

The whole design and construction of the machine, however, is materially simplified if the driving member be rigidly connected to one of the axles and steered integrally with it. In such a case there remains only to transmit the motion to the remaining axles through pivoting the members or by any other suitable means.

Fig. 4 diagrammatically shows one method of carrying this arrangement into effect. M diagrammatically shows the driving and speed-reducing engine; A—A' are the two axles; B is a beam connecting the two axle centers R—S. The motion is transmitted to the two wheels —m—m'— in the same way as in ordinary vehicles, through gear wheels or chain and a differential gear —$d_0$—. C is a universal joint through which motion is subsequently imparted to the differential gear —$d_0$—; E— is an extensible rod transmitting motion from universal joint C to universal joint D, differential gear $d_0$ and wheels —m—m'— of the axle —A'—.

The whole of the driving member M and axle A is steered integrally about a pivot S and simultaneously the axle A', through any suitable connection, is steered through the same angle about its center R.

By this arrangement, in addition to the great simplicity of construction and mounting, the further advantage is obtained that the motion of the differential gear can be readily transmitted to the four wheels through chains as in ordinary vehicles, thus securing a greater strength and longer life of the parts concerned.

The described arrangement of the machine parts also permits the axles to rock in a vertical plane and independently of each other so that they may assume various inclined positions relatively whereby all four wheels will at all times contact with the ground with the required traction.

To this end it is sufficient that a portion of the machine, preferably the portion carrying the motor, be capable of being swung at any time about the center line S—R connecting the axle centers.

Figs. 4 and 5 show an embodiment of this detail of the machine. In the said figures B is a tubular beam, about the head of which the machine portion carrying the axle —A— can be steered at S. Near the center of the machine both the driving and the other portion are given the shape of a circular sector (Figs. 4 and 6), the center points of the two sectors being R and S. The said sectors F—G are fitted with teeth U—V engaging a toothed pinion Z that can turn loose on the tubular beam B.

When the driver, by operating a suitable gear, steers the motor-carrying portion through a certain angle relatively to the tubular beam B, the other portion of the machine is necessarily steered through the same angle, and this is effected independently from the swing in a vertical plane which one axle may be subjected to relatively to the other axle.

Other arrangements may equally solve this detail.

Fig. 5 also shows a special method of carrying into effect the arrangement diagrammatically represented in Fig. 4, in which the various parts are so arranged as to realize the object desired in the most rational and simple way. By the arrangement according to Fig. 5 two forward and two rearward speeds can be obtained prior to the transmission of motion to the wheels of the two axles and, besides, the position of the various parts is the most convenient one for the said transmission.

In the special application to plow traction it is advantageous to cause the two right hand wheels to run in the furrow and the two left hand ones outside of it. In such a case, in order to keep the machine horizontal, it is necessary to be able to vertically displace the left hand wheels relatively to the right hand ones (Fig. 7).

An arrangement that will in practice assume such a relative position is diagrammatically represented in Fig. 8, wherein an arm —a— pivoting about the shaft of the differential gear —c— is capable of swinging and thus bringing the axle —b— of the left hand wheel into the different positions —b'— —b''—, which lie on the same circle having its center at C.

A screw spindle —d—, handwheel —e— and worm nut —f— enable the lever arm —a— to be swung so as to vary the position of the axle —b— as desired.

In Fig. 9 the combined application is shown of a vehicle A—A' as per Fig. 4 with a trail portion L fitted with "correct steering" arrangement and resting at its front end on the axle A' which thus becomes the front axle of the trail. In this way a combined vehicle with four driving and two trailing wheels is obtained, having great traction and carrying capacity.

The arrangement diagrammatically represented in Fig. 4 affords in practice a further advantage, namely that, since all parts, by which the drive, control and steering of the axle —A— are operated, are connected to and integral with only one part of the machine (that is to say they are independent from the other axle), and by removing the joint C, the connecting rod E and the portion carrying the axle A', the machine can be readily altered to a steering arrangement as in Fig. 9, ordinary carts as in Fig. 10, working machines as in Fig. 11, artillery wagons as in Fig. 12, and so on. The trails may also be steerless trails rigidly connected to the beam B, as shown in Figs. 10-11-12.

Having now described my invention and how the same is to be carried out, what I claim as my invention, is:

1. A self-propelled vehicle, comprising a pair of driving wheeled trucks, a driving engine rigidly secured to the axle of one of said trucks and to the motion-transmitting members for said axle, a motion transmitting gear rigidly secured to the axle of the other truck, an extensible rod adapted to transmit motion from one truck to the other, said rod being provided with universal joints, a beam pivotally connected to the axles of said trucks approximately at the longitudinal centers of the axles whereby the said axles may be rotated simultaneously through the same angle about the ends of the beam, and means for permitting the axle of one of the trucks to be swung vertically with relation to said beam thereby to bring said axle in a horizontal plane different from that of the other axle.

2. A self-propelled vehicle, comprising a pair of driving wheeled trucks, an engine rigidly secured to the axle of one of said trucks, a driven member rigidly secured to the axle of the other truck, a beam pivotally connected to both of said axles, flexible means for transmitting motion from the engine to the driven member, and coöperating means carried by said engine, driven member, and beam for rotating said driven member relatively to said beam when the engine is rotated.

3. The combination with a vehicle as set forth in claim 2, of means for raising the wheels at one side of the vehicle relatively to those at the other side.

4. A self-propelled vehicle as set forth in claim 1, the trucks being detachably connected.

In testimony whereof I affix my signature.

ING. UGO PAVESI.